United States Patent [19]

Laprie et al.

[11] 4,276,643

[45] Jun. 30, 1981

[54] METHOD OF AND MEANS FOR ROUTING BINARY MESSAGES THROUGH A MULTINODE DATA-TRANSMISSION SYSTEM

[75] Inventors: Jean-Claude Laprie; David R. Powell, both of Ramonville Saint Agne; Gérard Alcouffe, Valence; Paul Romand, Bourg de Peage, all of France

[73] Assignees: Agence Nationale de Valorisation de la Recherche (ANVAR), Neuilly sur Seine; Societe Crouzet, Paris, both of France

[21] Appl. No.: 20,475

[22] Filed: Mar. 14, 1979

[30] Foreign Application Priority Data

Mar. 17, 1978 [FR] France ................................ 78 07906

[51] Int. Cl.³ ............................................. G06F 11/00
[52] U.S. Cl. .................................. 371/8; 340/147 R; 340/147 C; 340/147 SC; 370/16
[58] Field of Search ...................... 371/8, 68; 370/16; 340/147 R, 147 C, 147 SC

[56] References Cited

U.S. PATENT DOCUMENTS

| | | | |
|---|---|---|---|
| 3,876,983 | 4/1975 | Zafiropulo et al. | 340/147 R |
| 3,886,318 | 5/1975 | Charransol et al. | 340/147 SC |
| 3,927,392 | 12/1975 | Caron | 340/146.1 BE |
| 4,016,539 | 4/1977 | Nanya | 340/147 R |
| 4,031,512 | 6/1977 | Faber | 340/147 R |
| 4,032,893 | 6/1977 | Moran | 340/147 C |

FOREIGN PATENT DOCUMENTS 7442380  7/1975  France .

OTHER PUBLICATIONS

Gray, Network Services in Systems Network Architecture, IEEE Transactions on Communications, vol. 25, No. 1, pp. 104-116, Jan. 1977.

W. Greene, A Review of Classification Schemes for Computer Communication Networks, Computer, vol. 10, No. 11, Nov. 1977, pp. 12-21.

T. B. Smith III, A Damage-and-Fault Tolerant Input-/Output Network, IEEE Int. Symposium on Fault-Tolerant Computing, pp. 4-7-4-11, 1974.

Primary Examiner—Charles E. Atkinson
Attorney, Agent, or Firm—Karl F. Ross

[57] ABSTRACT

A digital-data-transmission system includes a network formed from a multiplicity of nodes each having at least three pairs of input/output terminals of which one is connected to an associated subscriber station while the others are connected to respective other nodes so as to enable a binary message from any subscriber station to reach all other subscriber stations. The nodes form a plurality of pathways, at least some of them of different lengths, between any two subscriber stations yet a decision circuit at each node selects only one input terminal thereof for retransmission of an incoming message to all the output terminals of the node, such selection being based on the order of arrival or—in the case of simultaneous arrival—on a predetermined order of preference. The several subscriber stations may be equipped with respective controllers establishing time slots individually allocated thereto in order to prevent the simultaneous emission of messages from two or more stations. Also disclosed is an ancillary network with a cluster of subscriber stations grouped about a central point where a common transformer (or a common reflector in the case of fiber-optical signal transmission) establishes communication between this cluster and one of the nodes of the main network.

15 Claims, 16 Drawing Figures

METHOD OF AND MEANS FOR ROUTING BINARY MESSAGES THROUGH A MULTINODE DATA-TRANSMISSION SYSTEM

FIELD OF THE INVENTION

Our present invention relates to a method of and means for dispatching or routing a binary message from any one of a multiplicity of subscriber stations, associated with a digital-data-transmission system, to all other subscriber stations via a network formed from a multiplicity of nodes each having n input/output ports or terminal pairs, with n at least equal to three, linked by one two-way connection to an associated subscriber station and by (n-1) other two-way connections to as many other nodes of that network whereby a plurality of different pathways are formed between any two subscriber stations.

BACKGROUND OF THE INVENTION

If, in a network of this type, a message could be forwarded along all the possible routes, the message would arrive at a given node along several routes at different instants by reason of the unavoidable propagation delays due to the various electric circuits of the network, which would cause a degradation of the transmitted information. It is therefore desirable that the data be transmitted from node to node only through a single route. It is also desirable that such a network may be able to continue to operate when the transmission means (such as the conductors) and/or the nodes which were used for forwarding the messages have deteriorated. Thus, such a network ought to be capable of self-reconfiguration in case of a breakdown.

A network of this type is known in which the dispatching or routing of the messages is controlled by a central computer. It has been established, however, that the known network does not offer a sufficient flexibility for permitting such a reconfiguration, when there is a breakdown, which would be satisfactory in all cases; moreover, the network is subjected to the operational hazards of the central computer.

OBJECTS OF THE INVENTION

The general object of our present invention is to remedy the aforementioned disadvantages, and in particular to provide a signal-dispatching process in a digital-data-transmission network, along with means for implementing that process, enabling the reconfiguration of a network of the above-discussed type in the greatest possible number of breakdown cases. Thus, our invention aims at providing such a data-transmission network which is more resistant to external impact.

A more particular object of the invention is to provide means in such a network for avoiding the propagation of erroneous signals caused by breakdowns such as "adherences" where, at the output of a node, there appears an unvarying signal of logical value "0" or "1".

A further object of our invention is to provide a digital-data-transmission network whose operation is but little affected by breakdowns occurring at locations which are either widely separated or close to one another.

A still further object of the invention is to provide means at the central point of a star-shaped digital-data-transmission network for ensuring that the operation of stations referred to as "subscribers" (detection, control or calculation elements connected to a node at any point of the network) is only minimally affected by possible breakdowns of other subscribers or of the transmission routes extending from these other subscribers to the central point.

SUMMARY OF THE INVENTION

According to one aspect of our invention, the routing of binary messages through the aforedescribed multinode network comprises the steps of (a) detecting at each node the arrival, at the several ports thereof, of an incoming message traveling over different pathways from an originating subscriber station; (b) selecting, at each node, one of the ports thereof for exclusive reception of this incoming message; and (c) retransmitting at each node the received incoming message via all the ports of that node, including the port selected in step (b). Such selection may be made, in the case of simultaneous arrival of an incoming message at a plurality of ports, in accordance with a predetermined order of preference; in the case of staggered arrivals the selection may be carried out in favor of the port of earliest arrival.

Thus, another aspect of our invention resides in the provision of an improved node for such a network which comprises detection means connected to all its input terminals for monitoring the arrival of an incoming message, decision means connected to at least (n-1) input terminals of the node and controlled by the detection means for ascertaining the order of arrival of the incoming message over different pathways from the originating subscriber station and selecting one of these input terminals on the basis of that order of arrival, and switching means responsive to the decision means for establishing a transmission path from the selected input terminal to all the output terminals of the node.

Pursuant to a more specific feature of our present invention, the detection means may comprise a generator of a monitoring signal triggerable by the leading edge of a first message pulse and a delay circuit for maintaining this monitoring signal in existence beyond the trailing edge of a last message pulse while keeping the decision and switching means operative as long as the monitoring signal persists. The switching means, described hereinafter as a multiplexer, may be provided with a control input connected to the detection means for connecting all output terminals of the node to a source of constant voltage level in the absence of the monitoring signal.

BRIEF DESCRIPTION OF THE DRAWING

The above and other features of our invention will become apparent from the description of some of its embodiments, reference being made to the accompanying drawing wherein.

SPECIFIC DESCRIPTION

The digital-data-transmission system which will now be described is a network so designed in its various portions that localized breakdowns or even breakdowns in several spaced-apart locations cause only minimum disturbances in the overall operation of the network.

Figure 1:
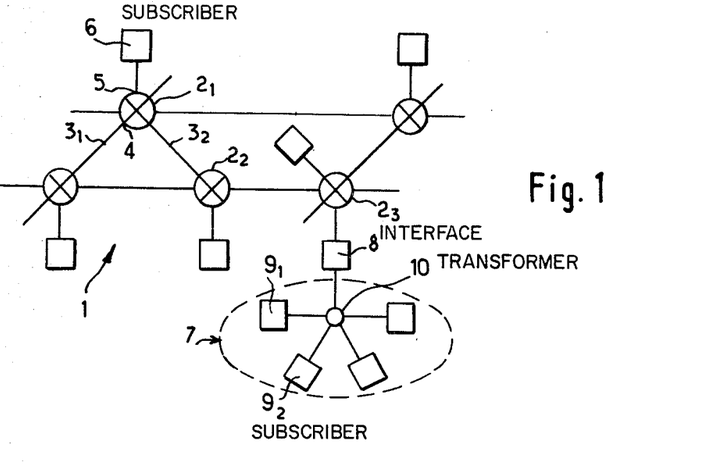
FIG. 1 shows the general layout of a digital-data-transmission system according to the invention.

FIG. 1 is a partial general schematic view of such a system. It comprises a main network 1 having nodes $2_1$, $2_2$, etc. which are the points common to several digital-data-transmission lines $3_1$, $3_2$, etc. Broadly interpreted, the expression "digital-data-transmission lines" includes not only lines made of conducting wires but also transmission paths using optical fibers.

The main network 1 is of irregular type, lacking a main transmission line or bus.

Each of the lines $3_1$, $3_2$, etc. is arranged for transmitting digital information, in the form of messages made up of a succession of binary digits "0" or "1", in both directions. Thus, a terminal 4 of node $2_1$ forms a message-receiving input from line $3_1$ as well as a message-transmitting output of node $2_1$ toward line $3_1$.

Each node has at least four terminals. Node $2_1$ has six terminals, one terminal 5 being connected to a "subscriber" 6, i.e. a device adapted for receiving or transmitting signals in digital form. Such a device may be designed for instance to detect a physical value, to control an operation (such as the opening of a valve) or to perform calculations.

Each node $2_1$, $2_2$, $2_3$ comprises circuitry which will be described hereinafter with reference to FIGS. 2 to 4.

Subscribers are connected to all the nodes of the communication system shown in FIG. 1. In the present instance, these subscribers are all widely separated.

The node $2_3$ of the main network 1 is connected to an ancillary network 7 through an interface circuit 8. The ancillary network 7 is of the star type and serves for connecting to node $2_3$ a group of subscribers $9_1$, $9_2$, etc. which, in the example, are located in close proximity to one another.

In the center of the star network 7 there is placed a transformer 10 which will be described with reference to FIGS. 8 to 10.

The node structure shown in FIGS. 2 and 3 allows, as described hereinafter with reference to FIG. 5, the routing of messages transmitted by one of the subscribers through the entire network. Such routing is effected at each node and is not decided as a function of an algorithm imposed by a remote computer.

Figure 2:
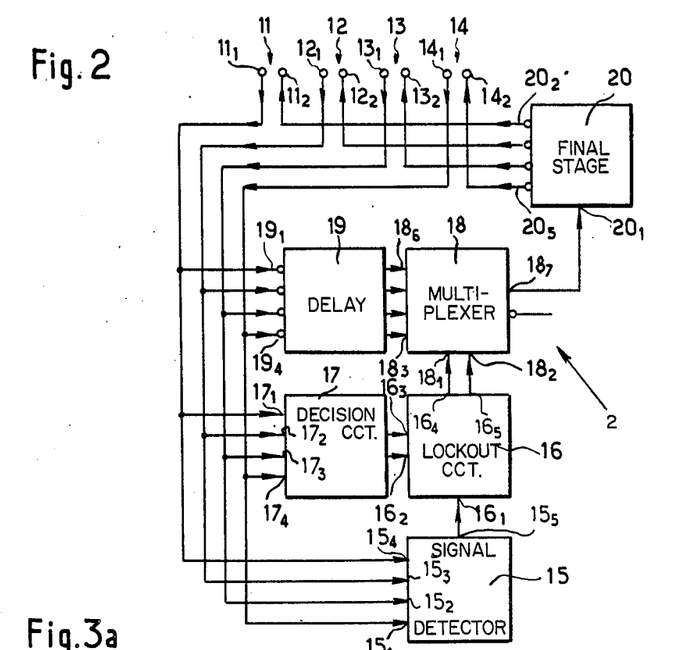
FIG. 2 is a schematic view of a node circuit according to the invention, forming part of the system shown in FIG. 1.

The node 2 shown in FIG. 2 comprises four pairs 11, 12, 13 and 14 of input/output terminals corresponding to respective terminals of nodes $2_1$, $2_2$..., of the main network (FIG. 1). The inputs of each pair are designated by a subscript 1 whereas the outputs are designated by a subscript 2.

Node 2 further comprises a signal-detecting circuit 15 with four inputs $15_1$, $15_2$, $15_3$ and $15_4$ respectively connected to inputs $11_1$ to $14_1$. The output $15_5$ of circuit 15 is connected to an input $16_1$ of a lockout circuit 16 also having two inputs $16_2$ and $16_3$ connected to two corresponding outputs of a decision or selection circuit 17 having four inputs $17_1$ to $17_4$ respectively connected to inputs $11_1$, $12_1$, $13_1$ and $14_1$.

Lockout circuit 16 has two outputs $16_4$ and $16_5$ connected to two inputs $18_1$ and $18_2$ of a multiplexing circuit 18. Multiplexer 18 has four other inputs $18_3$ to $18_6$ which are connected to corresponding outputs of a delay circuit 19 having also four inputs $19_1$ to $19_4$ respectively connected to inputs $11_1$ to $14_1$.

The output $18_7$ of circuit 18 is connected to the input $20_1$ of a final stage 20 with four outputs $20_2$ to $20_5$ respectively connected to the outputs $11_2$ to $14_2$ of node 2.

Figure 4:
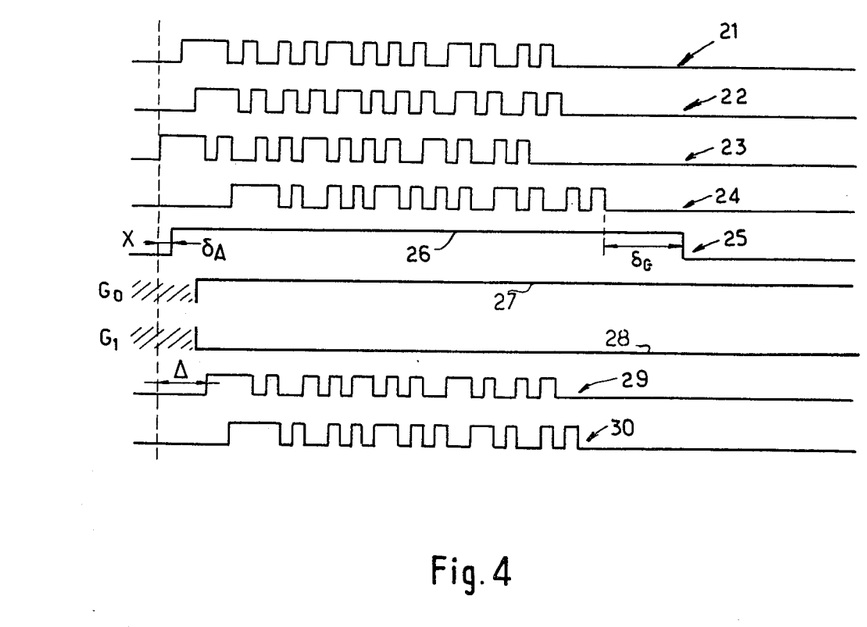
FIG. 4 is a set of graphs illustrating the operation of the circuitry shown in FIGS. 2 or 3.

The graphs of FIG. 4 serve to explain the operation of the circuitry which has just been described. These graphs show the variations of signals at different points of the node as a function of time plotted on the abscissa. Graph 21 shows the temporal variations of a signal (message) applied to input $11_1$. Similarly, graphs 22, 23 and 24 illustrate the temporal variations of signals applied to inputs $12_1$, $13_1$ and $14_1$, respectively.

Of course, the messages appearing on these inputs are in the form of sequences of binary digits "0" or "1" respectively represented by a low and a high signal level. The messages are so coded that it is not necessary to provide a clock for decoding them; thus, it will be noted that—after a wider start pulse—a switchover invariably occurs at predetermined intervals. The system operates therefore in an asynchronous mode.

Graph 25 shows the temporal variations of a signal X (cf. FIG. 3) delivered at output $15_5$ of detecting circuit 15. As indicated, circuit 15 generates a high level 26 after a time $\delta_A$, of the order of 60 ns in the present example, after the apparition of the first leading edge received on any of its inputs $15_1$ to $15_4$ and thus on one of the inputs $11_1$ to $14_1$ of the node. The signal level 26 is maintained until the end of a period $\delta_G$ (of the order of 1.5 μs) following the last trailing edge of the incoming message signals.

Graph 27 shows a discriminating signal $G_0$ delivered on output $16_4$ of circuit 16 whereas graph 28 shows a similar signal $G_1$ emitted on output $16_5$ thereof. Binary signals $G_0$ and $G_1$ represent two bits of a binary number representing the node input selected by decision circuit 17. The truth table correlating the levels of signals $G_0$ and $G_1$ with the selection of any terminal 11, 12, 13 or 14 is as follows:

TABLE I

| $G_0$ | $G_1$ | selected input |
|---|---|---|
| 1 | 1 | $14_1$ |
| 1 | 0 | $13_1$ |
| 0 | 1 | $12_1$ |
| 0 | 0 | $11_1$ |

In this way, circuit 17 selects from among the incoming message signals, represented by graphs 21 to 24, the one that is to be transmitted by the node on the basis of their order of arrival. Thus, in the present instance, the message applied to input $13_1$ is the first to arrive; therefore, it will be this message which will be fed to all the outputs of circuit 20. If messages arrive simultaneously on several inputs, decision circuit 17 will select the one which is to be transmitted on the basis of a pre-established order of preference corresponding to the value of the two-bit selection code, the code of lowest numerical value having priority. Thus, if messages arrive simultaneously on inputs $11_1$ and $13_1$, it will be the signal applied to input $11_1$ which will be transmitted.

Circuit 19 delays all the signals applied to its inputs $19_1$ to $19_4$ by a duration $\Delta$ equal to 150 ns in the present example. The signals fed to the inputs $18_3$ to $18_6$ of the multiplexer 18 correspond therefore to the signals presented to the respective inputs $11_1$ to $14_1$, but with a delay $\Delta$. Graph 29 represents the signal appearing on output $18_7$ of multiplexer 18, which is the signal on input $13_1$ (graph 23) delayed by the duration $\Delta$. This delay $\Delta$ is at least equal to the operating time of circuits 16 and 17.

Graph 30 represents the signals emitted by the final stage 20 on all its output terminals $20_2$ to $20_5$. These signals are delayed by a duration of the order of 20 ns relative to the signals presented to the inputs $18_3$ to $18_6$ of multiplexer 18. This delay corresponds to the propagation delay in the multiplexer and in stage 20.

To sum it up, the circuitry shown in FIG. 2 selects among several incoming signals the one which is to be applied to its outputs. The output signals lag the input signals by a predetermined delay.

Figure 3:
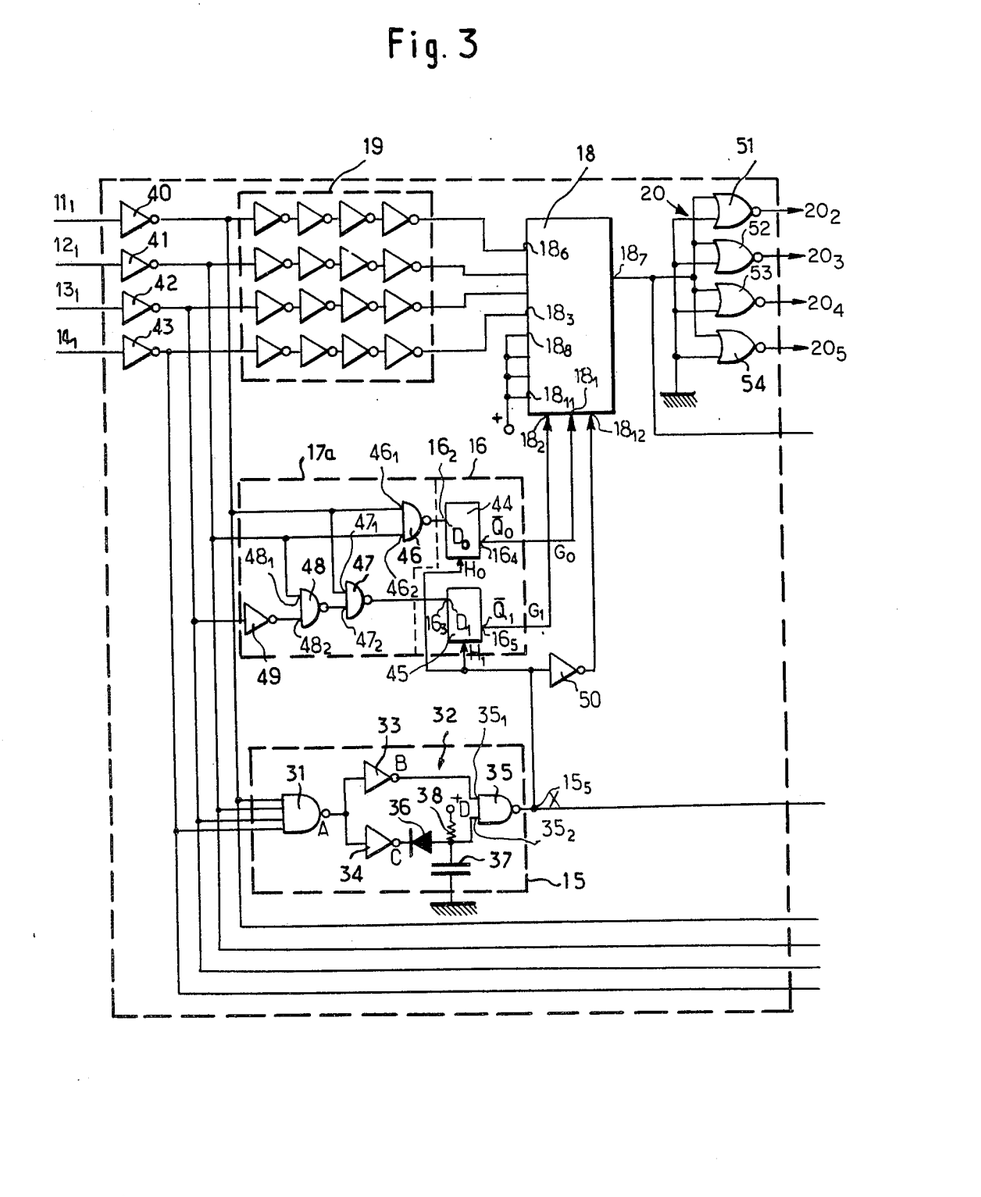
FIG. 3 shows a detailed embodiment of the circuitry of FIG. 2.

We shall now describe, with reference to FIG. 3, a particular embodiment of the node shown in block form in FIG. 2.

The inputs $11_1$ to $14_1$ are, in this embodiment, connected to corresponding inputs of circuits 15, 17a and 19 through respective inverters 40, 41, 42 and 43, e.g. of the type manufactured under designation 7404 by Texas Instrument Co. Circuit 17a differs from block 17 of FIG. 2 by the absence of a connection to input $14_1$.

The signal detector 15, generating the X signal of graph 25 (FIG. 4), comprises a circuit 32 of the "retriggerable" monostable (one-shot multivibrator or monoflop) type which can be triggered by a certain voltage level and not by a pulse flank or edge.

Upstream of monoflop 32 we provide a NAND gate 31, e.g. as manufactured under designation 7413, with four inputs corresponding to those labeled $15_1$ to $15_4$ in FIG. 2. Circuit 15 further includes two inverters 33 and 34 (one of them being of type 7404 and the other of type 74L04) whose inputs are connected in parallel to the output of gate 31. The output of inverter 33 is connected to a first input $35_1$ of a Schmitt trigger 35, e.g. as manufactured under designation 7413, whose inverting output forms the terminal $15_5$.

The output of inverter 34 is connected to the cathode of a diode 36 whose anode is grounded through a capacitor 37, of 2.2 nF in a specific instance, and is tied to the positive (+) pole of a dc voltage source (not shown) through a resistor 38. This anode of diode 36 is also connected to the second input $35_2$ of Schmitt trigger 35.

Figure 3A:
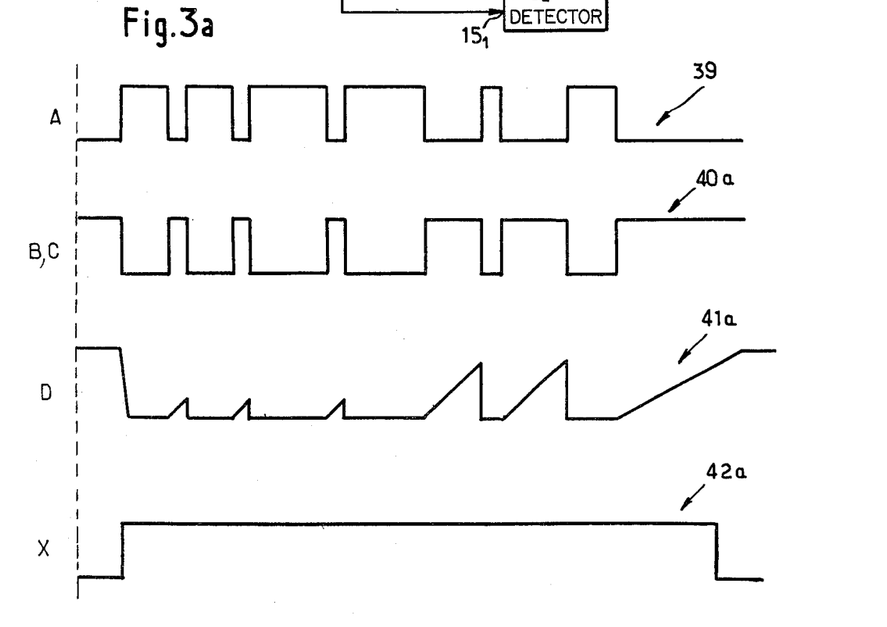
FIG. 3a is a set of graphs serving to explain the operation of part of the circuitry shown in FIG. 3.

The graphs of FIG. 3a show the values of signals at various points of circuit 15. Graph 39 shows a digital signal A emitted by gate 31. Graph 40a shows signals B and C appearing on the outputs of inverters 33 and 34.

Graph 41a shows the temporal variations of a signal D present on the second input $35_2$ of Schmitt trigger 35 whereas graph 42a shows the signal X appearing on the output $15_5$ of circuit 15.

It will be noted here that a monostable multivibrator which can be triggered on a voltage level is less sensitive to noises than the usual monoflops that are triggered by rising pulse flanks.

Lockout circuit 16 comprises two data-type flip-flops 44 and 45, e.g. as available under designation 7474. The output $15_5$ of circuit 15 is connected to the clock inputs $H_0$, $H_1$ of these two flip-flops whose reset outputs $\overline{Q_0}$ and $\overline{Q_1}$ constitute the terminals $16_4$ and $16_5$ of circuit 16 carrying signals $G_0$ and $G_1$, respectively. Terminals $16_2$ and $16_3$ are formed by the data inputs $D_0$ and $D_1$ of the same flip-flops 44 and 45.

Decision circuit 17a comprises in this embodiment three NAND gates 46, 47 and 48 (e.g. of type 7400) with two inputs each as well as an inverter 49, e.g. of type 7404. The first input $46_1$ of gate 46 is connected to the output of inverter 40 while its second input $46_2$ is connected to the output of inverter 41. The output of this gate 46 is connected to input $D_0$ of flip-flop 44.

The NAND gate 47 has a first input $47_1$, connected to the output of inverter 40, and a second input $47_2$ connected to the output of gate 48. The first input $48_1$ of the latter is connected to the output of inverter 41 whereas its second input $48_2$ is connected to the output of inverter 42 through an inverter 49.

The truth table of circuit 17a is as follows:

TABLE II

| $11_1$ | $12_1$ | $13_1$ | $14_1$ | $D_0$ | $D_1$ | selected input |
|---|---|---|---|---|---|---|
| 0 | 0 | 0 | X | 0 | 0 | $14_1$ |
| 0 | 0 | 1 | X | 0 | 1 | $13_1$ |
| 0 | 1 | X | X | 1 | 0 | $12_1$ |
| 1 | X | X | X | 1 | 1 | $11_1$ |

In Table II the crosses represent indifferent values of a binary signal. Thus, the signals appearing at the inputs $D_0$ and $D_1$ of flip-flops 44 and 45 are independent of the logical values (0 or 1) of the signals marked with such a cross in this Table.

A correspondence between the values of signals $D_0$ and $D_1$, applied to the inputs $16_2$ and $16_3$ of circuit 16, and the selected input terminals has also been indicated in Table II. This correspondence conforms to that of Table I since the signals on inputs $D_0$ and $D_1$ are complementary to signals $G_0$ and $G_1$ appearing on the outputs $\overline{Q_0}$ and $\overline{Q_1}$ of flip-flops 44 and 45. The selection is carried out by using the multiplexing circuit 18 which may comprise a read-only memory such as that available under designation 74151.

As shown in the foregoing Table II, the order of arrival of the incoming signals is decisive for selecting the incoming message which is to be transmitted to all the outputs; in the case of simultaneous arrivals, it is the rank of the arrival which determines the selection in the aforementioned sequence: $11_1$, $12_1$, $13_1$ and $14_1$.

The delay circuit 19 is shown to comprise four sets of cascaded inverters and may be of the type available under the designation 74L04.

Switching circuit 18 comprises, besides inputs $18_3$ to $18_6$, four additional inputs $18_8$ to $18_{11}$ which are connected to the positive terminal of a dc voltage source (not shown). It has also a control input $18_{12}$ which is connected to the output $15_5$ of circuit 15 through an inverter 50 (also of the 74L04 type). When a signal of value 1 is applied to this input $18_{12}$, there appears on output $18_7$ a signal of the same value independently of the values of the signals applied to the other inputs of the circuit. The outputs of the node are therefore cut off in case of an adherence to zero of the detection or message-monitoring signal X.

The final stage 20 comprises four NOR gates 51 to 54, for instance those of type 74128, with two inputs each, acting as signal inverters and line drivers. One input of each gate is connected to the output $18_7$ of switching circuit 18 while its other input is grounded. The outputs of gates 51–54 form the terminals $20_2$ to $20_5$ of stage 20.

Figure 2A:
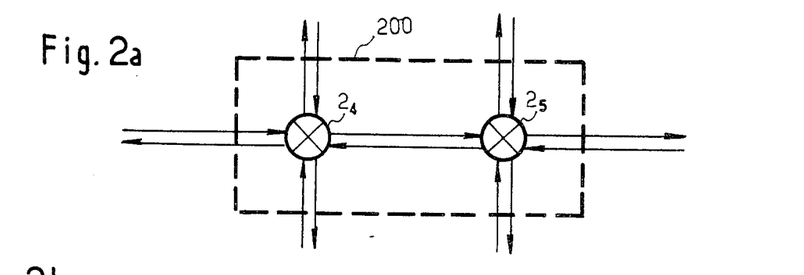
FIGS. 2a and 2b show how two node circuits of the type shown in FIG. 2 can be combined in order to form a node structure having a number of input/output terminals higher than that of each individual circuit.
Figure 2B:
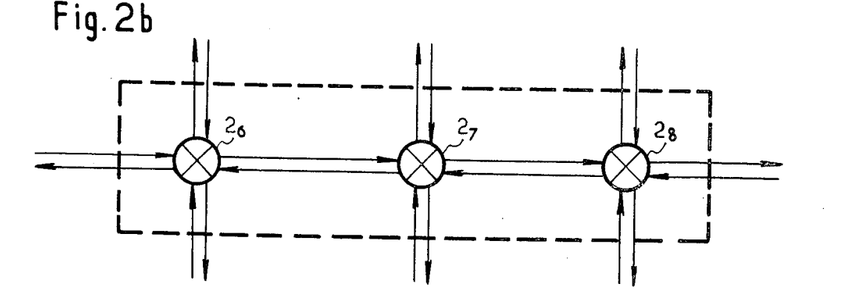

A circuit arrangement of this type has four input/output ports or terminal pairs, one for communication with the associated subscriber and the three others for connection to the other nodes of the network. This number of terminals is sufficient for most applications of digital-data-transmission networks. However, it may be necessary for some applications that the nodes have more than four terminal pairs. The node structure according to our invention may be suitably modified for this purpose. As shown in FIG. 2a, two nodal units $2_4$ and $2_5$ with four input/output ports each make up a node 200 with six ports. To this end we only need to connect a port of unit $2_5$ to a port of unit $2_4$. Furthermore, as shown in FIG. 2b, we may use three nodal units $2_6$, $2_7$ and $2_8$ with four input/output ports each for providing a node with eight ports. In the latter case, a terminal pair of unit $2_6$ is connected to a terminal pair of unit $2_7$ which has another such terminal pair connected to a terminal pair of unit $2_8$.

A composite node formed from a combination of several nodal units with four input/output ports each should have a single input/output port connected to a subscriber, the remaining ports being connected to complementary ports of other nodes.

The security of operation at any node may be improved by providing each of them with two nodal units, e.g. in parallel, linked to comparison and control circuits so that either unit will be automatically disconnected from the network in case of failure. The comparison between the signals supplied by constituent units can be effected with the assistance of Carter comparators, for example.

Figures 5, 6, 7:
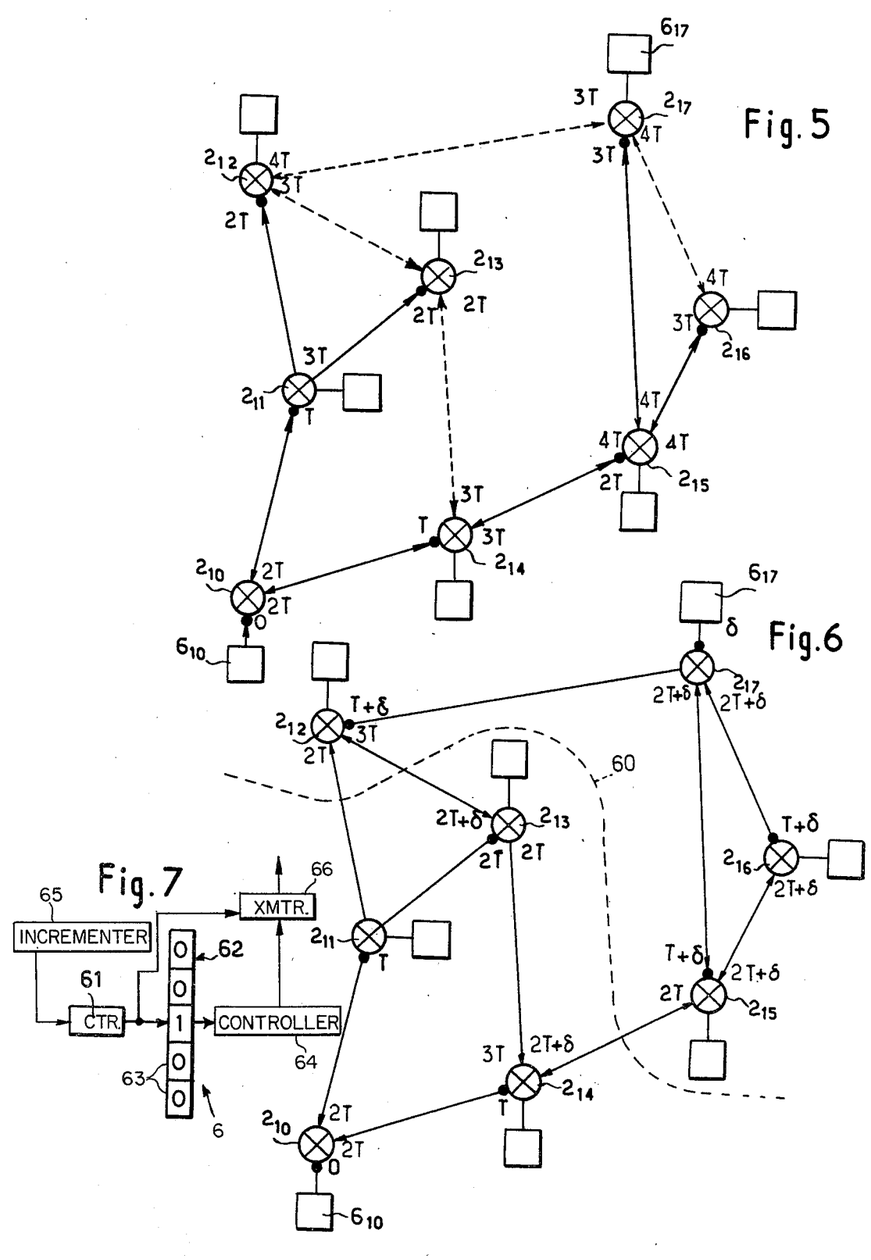
FIG. 5 is a schematic view of a part of the system shown in FIG. 1 designed to explain the dispatching of messages in that part of the system.
FIG. 6 is a view similar to that of FIG. 5, explaining the operation of the same part of the system in case of simultaneous transmission of several messages.
FIG. 7 is a block diagram of an element of the system shown in FIG. 1.

Referring to FIG. 5, we shall now describe how the messages transmitted by a subscriber are routed in a network whose nodes each have a structure such as that of FIGS. 2 and 3.

The network shown in FIG. 5 has eight nodes $2_{10}$ to $2_{17}$ to each of which is connected a respective subscriber $6_{10}$ to $6_{17}$.

The several nodes are interconnected as follows: the node $2_{10}$ is connected directly to nodes $2_{11}$ and $2_{14}$. The node $2_{11}$ is connected directly to nodes $2_{10}$, $2_{12}$ and $2_{14}$. The node $2_{12}$ is connected to nodes $2_{11}$, $2_{13}$ and $2_{17}$. The node $2_{13}$ is connected to nodes $2_{11}$, $2_{12}$ and $2_{14}$. The node $2_{14}$ is connected to nodes $2_{10}$, $2_{13}$ and $2_{15}$. This latter node is connected to nodes $2_{14}$, $2_{16}$ and $2_{17}$. Finally, a connection exists between nodes $2_{16}$ and $2_{17}$.

In this example, the subscriber $6_{10}$ transmits a message at time zero. This message arrives at a time T on those inputs of nodes $2_{11}$ and $2_{14}$ (marked by black circles in FIG. 5) which are connected to the corresponding outputs of node $2_{10}$ and which, it is assumed, are the first among the several inputs of each of these nodes to receive a message. Thus, all the outputs of nodes $2_{11}$ and $2_{14}$ will carry this incoming message.

If the transit time from one node to the next is always of the same magnitude T, the message will arrive at nodes $2_{12}$, $2_{13}$ and $2_{15}$ at instant 2T. It should be noted that the message reaches node $2_{13}$ via two different routes, i.e. one coming from node $2_{11}$ and the other coming from node $2_{14}$. In this case, the selected input is that which is directly connected to the output of node $2_{11}$ on account of the aforedescribed order of preference.

The routes followed by the message have been shown in full lines whereas the unselected routes have been shown dotted.

The message coming from node $2_{13}$ returns to the corresponding input of node $2_{11}$ at time 3T, as shown in the Figure, but this fact does not disturb the operation of the latter node which sends out only the message received first, i.e. at time T.

At time 3T, node $2_{16}$ receives the message successively transmitted by nodes $2_{14}$ and $2_{15}$; the same applies to node $2_{17}$ which receives also at the time the message from node $2_{12}$, but this arrival is inconsequential because of preferential selection.

The forwarding of the messages is therefrom unaffected by retransmission from a receiving node or by the simultaneous arrival of messages at one and the same node. Moreover, the use of the order of arrival as a selection criterion causes each message to be transmitted as quickly as possible and by the shortest available route.

In the example just described, a single subscriber (here station $6_{10}$) was transmitting a message; it may happen, however, that two subscribers transmit messages simultaneously. This situation and the consequences arising from it are illustrated in the diagram of FIG. 6 showing the same digital-data-transmission network as FIG. 5, but with subscribers $6_{10}$ and $6_{17}$ beginning to send out messages at respective instants 0 and δ. The interval δ is assumed to be shorter than the transit time T between adjacent nodes.

The network of FIG. 6 may be considered split into two portions separated by an imaginary line 60. The nodes $2_{12}$, $2_{16}$ and $2_{17}$, which are on one side of line 60, forward the message transmitted by subscriber $6_{10}$. Such a situation temporarily prevents communication between subscribers lying in different portions of the data-transmission network. We therefore prefer to provide the network with means for so correlating the exchange of information as to avoid conflicts of this type by authorizing the emission of only one message at a time.

For this purpose we may provide each subscriber 6 with a message counter 61 and a read-only storage register 62 as shown in FIG. 7.

Each register 62 comprises a plurality of cells 63 whose number is at least equal to that of the subscribers associated with the network, each of these cells being allocated to a respective subscriber. The cell of each register 62 allocated to the corresponding subscriber contains a "1", whereas zeroes are stored in all the other cells of that register.

The counter 61 successively scans the cells of register 62 so that on the output of this register appears the bit stored in the cell whose address conforms to the current reading of the counter.

The output of register 62 is connected to the input of a device 64 controlling the emission of messages by the corresponding subscriber so that the latter may transmit only when a signal "1" appears on this output, i.e. during a certain time slot of a recurrent counting cycle.

The contents of counter 61 are identical for all the subscribers; moreover, to each counter 61 is connected an incrementer 65 which increases the contents of the counter by one unit after the reception by the corresponding subscriber of the end of each message. Thus, a definite order of message emission is established among the various subscribers of a network so that the conflicting situations discussed in connection with FIG. 6 cannot arise.

We also prefer to provide means (not shown) for detecting and comparing the contents of the various counters 61 of the subscribers 6 and for correlating their settings at the beginning of operations or after a breakdown. For this purpose, the contents of counter 61 are also fed to a transmitter 66 enabling each outgoing message to be supplemented by the reading of the respective counter. In this case, a receiving subscriber detecting a difference between the contents of its own counter and those of the counter of a transmitting subscriber will send out a "priority" signal which will be preferentially routed through the network so as to zeroize all the counters 61 to zero. Each node should then include means for recognizing this priority signal.

Figure 3B:
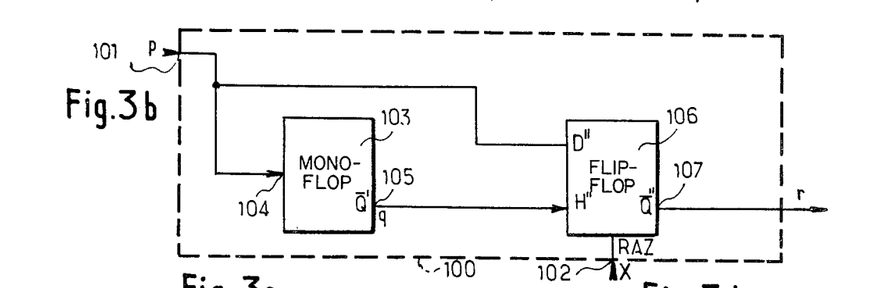
FIG. 3b illustrates a component which can be used in the circuitry of FIG. 3.

In order to facilitate such recognition, the priority signal may be a square wave of 2 MHz frequency, higher than that of the information carrier of the message signal (1 megabit/second). FIG. 3b shows a discriminating device 100 having an input 101 connected to the output of inverter 40 (FIG. 3) whereas its output is connected through gates (not shown) to the corresponding input $18_6$ of switching circuit 18. A device of the same type is provided for each input/output pair of the node.

Discriminator 100 further has an input 102 connected to the output $15_5$ of circuit 15. In order to detect pulses of a duration shorter than the width of each message bit, device 100 comprises a monoflop 103 (e.g. of type 74123) with an off-normal period $\tau$ slightly less than the width of a message bit; the triggering input 104 of monoflop 103 is connected to the input 101 while its normal ($\overline{Q'}$) output 105 is connected to the clock input H" of a data-type flip-flop 106 whose data input D" is also connected to terminal 101. The reset ($\overline{Q''}$) output 107 of flip-flop 106 forms the output terminal of the device 100 and its resetting input RAZ is directly connected to terminal 102.

Figure 3C:
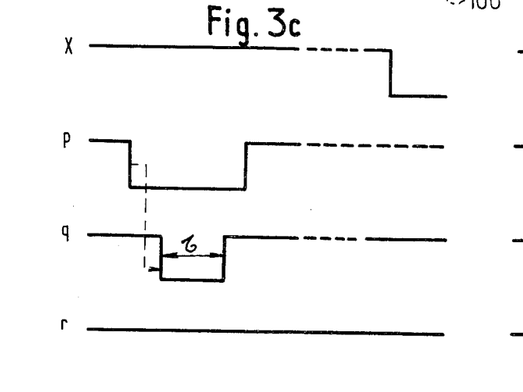
FIGS. 3c and 3d are sets of graphs illustrating the operation of the component shown in FIG. 3b.
Figure 3D:
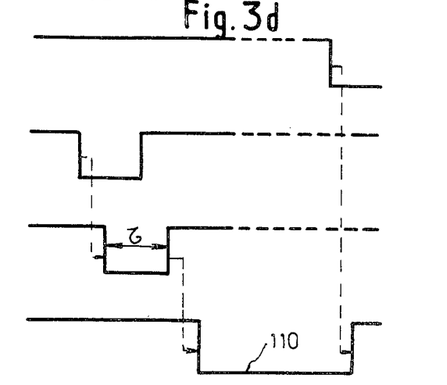

FIGS. 3c and 3d show the operation of the device 100 illustrated in FIG. 3b. The graphs of FIG. 3c correspond to its operation when pulses p applied to input 101 have a duration exceeding the period $\tau$, as is the case in the transmission of normal messages. The graphs of FIG. 3d show the operation of the device 100 when the pulses applied to its input 101 have a duration shorter than $\tau$, which is the case upon the transmission of priority signals.

The top graphs of FIGS. 3c and 3d show the pulse X (cf. FIG. 4) supplied to input 102. The second graphs show the signals p applied to input 101, the third graphs show signals q exiting from terminal 105 of monoflop 103, and the bottom graphs show the output pulses r of device 100.

FIG. 3c shows that if a pulse p outlasting the off-normal period $\tau$ appears at the input 101 of device 100, the latter does not cause the generation of a pulse r; on the other hand (FIG. 3d), when a pulse of duration less than $\tau$ appears at input 101, the device 100 generates a zeroizing pulse r of low level 110 on output 107.

The incrementer 65 shown in FIG. 7 may be of the type known as "watchdog" designed to step the counter 61 at the end of a predetermined period, when the subscriber identified by the current reading of the counter is not operating. This predetermined period should be at least equal to twice the oropagation time of the message through the network and therefore depends on the number of nodes. It is of the order of 3 to 4 microseconds when the network has 32 nodes.

Figures 8, 9:
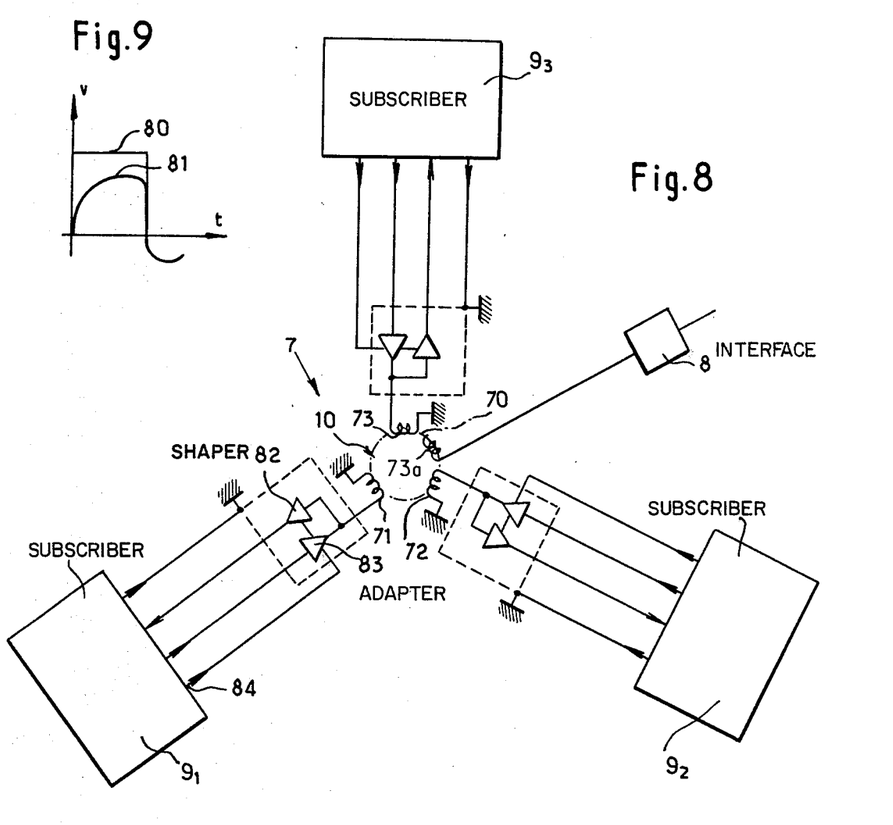
FIG. 8 is a schematic view of a star network which is part of the system shown in FIG. 1.
FIG. 9 is a graph illustrating the operation of the star network of FIG. 8 at its central point.
Figure 10:
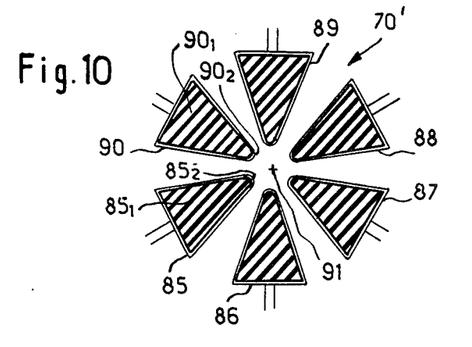
FIG. 10 shows schematically an embodiment of a transformer according to the invention installed at the central point of the star network shown in FIG. 8.

FIGS. 8 to 10 illustrate an embodiment of the star-shaped ancillary network 7 of the system shown in FIG. 1.

In this example, the central point 10 of the star network comprises a pulse transformer 70 whose coupling coefficient is low, at most equal to 0.5, in contradistinction to conventional pulse transformers having a high coupling coefficient at least equal to 0.9.

With such a low coupling coefficient the consequences of a breakdown of one of the subscribers of the star network are minimized; in fact, a short circuit or an "adherence" of one of these subscribers has practically no effect upon the other subscribers.

We have found that the maximum value of the coupling coefficient suitable for obtaining the aforementioned insensitivity to breakdown depends on the number of subscribers connected to transformer 70. Thus, in the case shown in FIG. 8 where only three subscribers are connected to the central point 10, a coupling coefficient of 0.5 still yields the desired result. However, if the greatest possible manner of subscribers are to be connected to point 10, we prefer to use a substantially lower coupling coefficient of, e.g., 0.1 or even 0.01.

In the present example, transformer 70 is of the air-core type and has therefore no ferromagnetic circuit. It comprises closely spaced windings 71, 72, 73 and 73a (FIG. 8); windings 71, 72 and 73 are connected to respective subscribers $9_1$, $9_2$ and $9_3$, whereas winding 73a is connected to the main network 1 (FIG. 1) through the interface circuit 8. The transmission and reception of pulses by the various subscribers $9_1$, $9_2$ and $9_3$ clustered around star network 7 is carried out by the simple electromagnetic coupling of the transmitting coil to the other windings which then act as receiving coils.

FIG. 9 is a graph showing the variations, as a function of time t, of the values v of the signals transmitted and received by the coils.

The curve 80 of FIG. 9 is an outgoing rectangular signal (transmission pulse) whereas the curve 81 shows the variations of the signal induced in a receiving coil (71, 72, 73 or 73a) when their coupling coefficient is of the order of 0.1. Of course, the shape of signal 81 is not rectangular. It is therefore necessary to provide shaping means for restoring the incoming signal to a rectangular shape before transmitting it to the corresponding subscriber. In FIG. 8, therefore, we have shown a pulse shaper 82 inserted in the incoming signal path between each subscriber, such as station $9_1$, and the corresponding coil, such as winding 71. Moreover, the signals generated by subscriber $9_1$ are transmitted to coil 71 through a device 83 serving to adapt the output impedance of the subscriber to the lower impedance of the transformer 70 and also to linearize the impedance upstream of winding 71.

Circuits 82 and 83 are duplicated for each subscriber and are energized by a source, not shown, in the associated subscriber station via an output 84 thereof.

FIG. 10 shows a modified pulse transformer 70' according to our invention. In this instance, windings 85, 86, 87, 88, 89 and 90 are respectively wound on insulating cores $85_1$ to $90_1$ whose cross-sections are in the shape of mutually indentical isosceles triangles and whose apexes $85_2$ to $90_2$, at the intersections of their equal sides, closely approach one another. The insulating cores are regularly distributed about a central point 91 confronted by these apexes.

In this instance, too, there exists effective insulation among the various subscribers connected to windings 85–90.

Instead of using a transformer with low coupling factor, the ancillary network could comprise optical fibers for signal transmission and, at its central point, a mirror (not shown) toward which all these fibers converge. The mirror reflects the optical signals transmitted by any subscriber toward the other subscribers.

The uses of our improved digital-data-transmission network are numerous. However, its preferred field of application is that of media highly susceptible to breakdowns. In particular, it can be used for the transmission of control and checking informations on board of aircraft, or for the realization of automated manufacturing plants.

We claim:

1. A method of routing binary messages through a digital-data-transmission system including a network formed from a multiplicity of nodes each having at least three input/output ports respectively linked by one two-way connection to an associated subscriber station and by a plurality of other two-way connections to as many other nodes of said network, said nodes forming a plurality of different pathways between any two subscriber stations for allowing a message originating at any one of said subscriber stations to reach all other of said subscriber stations, comprising the steps of:
(a) detecting at each node the arrival, at the several ports thereof, of an incoming message traveling over different pathways from an originating subscriber station;
(b) selecting, at each node, one of the ports thereof for exclusive reception of said incoming message; and
(c) retransmitting at each node the received incoming message via all the ports of the node including the port selected in step (b).

2. A method as defined in claim 1 wherein the selection in step (b) is made, in the case of simultaneous arrival of an incoming message at a plurality of ports, in accordance with a predetermined order of preference.

3. A method as defined in claim 1 or 2 wherein the selection in step (b) is made, in the case of staggered arrivals of an incoming message at a plurality of ports, in favor of the port of earliest arrival.

4. A method as defined in claim 1 wherein each of said subscriber stations is authorized to send out a message only during a respective time slot of a recurrent counting cycle, each message being accompanied by an identification of the time slot allocated to the originating subscriber station for enabling other subscriber stations to recognize possible divergences in the count of said time slots.

5. A method as defined in claim 4 wherein a subscriber station recognizing a divergence emits a distinctive priority signal by way of said network to all other subscriber stations for resynchronizing their counts.

6. In a digital-data-transmission system including a network formed from a multiplicity of nodes each having n input terminals respectively paired with n output terminals, n being equal to at least three, one terminal pair of each node being linked by a two-way connection to an associated subscriber station, the remaining (n-1) terminal pairs of each node being linked by other two-way connections to complementary terminal pairs of as many other nodes whereby a plurality of pathways are formed between any two subscriber stations for allowing a binary message originating at any one of said subscriber stations to reach all other of said subscriber stations, the improvement wherein each node comprises:
detection means connected to all input terminals of the node for monitoring the arrival of an incoming message;
decision means connected to at least (n-1) input terminals of the node and controlled by said detection means for ascertaining the order of arrival of said incoming message over different pathways from an originating subscriber station and selecting one of said input terminals on the basis of said order of arrival; and
switching means responsive to said decision means for establishing a transmission path from the selected input terminal to all the output terminals of the node.

7. The improvement defined in claim 6 wherein said detection means comprises a generator of a monitoring signal triggerable by the leading edge of a first message pulse and a delay circuit for maintaining said monitoring signal in existence beyond the trailing edge of a last message pulse, said decision and switching means being kept operative by said detection means in the presence of said monitoring signal.

8. The improvement defined in claim 7 wherein said switching means has a control input connected to said detection means for connecting all said output terminals to a source of constant voltage level in the absence of said monitoring signal.

9. The improvement defined in claim 7 or 8 wherein, with n=4, said decision means comprises two flip-flops with data inputs connected via a set of logic gates to three of said input terminals and with clock input connected in parallel to said detection means for energization by said monitoring signal.

10. The improvement defined in claim 6, 7 or 8 wherein each node further includes delay means inserted between said input terminals and said switching means for retarding the transmission of an incoming message to said output terminals by a period at least equal to the time required for said detection and switching means to respond to the arrival of such message.

11. The improvement defined in claim 6 wherein each of said subscriber stations is provided with control means for establishing a recurrent cycle of time slots respectively allocated to said subscriber stations, said control means inhibiting the emission of an outgoing message from the respective subscriber station during any time slot other than the allocated one.

12. The improvement defined in claim 11 wherein said control means includes a message counter and a register with a number of cells equal to the number of subscriber stations successively scannable by said counter, the contents of only one of said cells enabling the emission of an outgoing message.

13. The improvement defined in claim 12 wherein each of said subscriber stations includes transmission means connected to said counter for supplementing each outgoing message with the current time-slot count and for emitting a distinctive priority signal upon recognition of a discrepancy between the reading of said counter and the time-slot count accompanying an incoming message.

14. The improvement defined in claim 13 wherein said priority signal consists of pulses shorter than a message bit, each node being further provided with discriminating means responsive to said shorter pulses for generating a zero-setting signal for all message counters.

15. The improvement defined in claim 14 wherein said discriminating means comprises a monoflop and a flip-flop in cascade with each other; said monoflop having an off-normal period shorter than a message bit, a triggering input connected in parallel with a data input of said flip-flop, and an output connected to a clock input of said flip-flop.

* * * * *